United States Patent
Shaik et al.

(10) Patent No.: US 9,509,693 B2
(45) Date of Patent: Nov. 29, 2016

(54) FLEXIBLE AND GENERALIZED AUTHENTICATION

(71) Applicant: Alcatel-Lucent Canada, Inc., Ottawa (CA)

(72) Inventors: Shanawaz Shaik, Ottawa (CA); Ramaswamy Subramanian, Ottawa (CA); Tiru K. Sheth, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 138 days.

(21) Appl. No.: 14/133,753

(22) Filed: Dec. 19, 2013

(65) Prior Publication Data

US 2015/0180871 A1    Jun. 25, 2015

(51) Int. Cl.
*H04L 29/06* (2006.01)
*H04L 29/08* (2006.01)

(52) U.S. Cl.
CPC ......... *H04L 63/0892* (2013.01); *H04L 67/306* (2013.01)

(58) Field of Classification Search
CPC ............. H04L 67/306; H04L 63/0892; H04L 9/3226; H04L 9/3236; H04L 63/126; H04L 63/083; G06F 17/30097
USPC .................................. 726/2–7; 709/227–229
See application file for complete search history.

(56) References Cited

U.S. PATENT DOCUMENTS

| | | | |
|---|---|---|---|
| 2010/0232606 A1* | 9/2010 | Lee et al. | 380/270 |
| 2011/0196977 A1* | 8/2011 | Lynch et al. | 709/229 |
| 2012/0144471 A1* | 6/2012 | Tsang et al. | 726/7 |
| 2012/0297074 A1 | 11/2012 | Mo et al. | |
| 2013/0185767 A1 | 7/2013 | Tirupachur Comerica et al. | |

OTHER PUBLICATIONS

C. Rigney et al., Remote Authentication Dial in User Service (RADIUS), The Internet Society, Jun. 2000, RFC 2138, pp. 1-75.
International Search Report for PCT/CA2014/051183 dated Feb. 10, 2015.

* cited by examiner

*Primary Examiner* — Amir Mehrmanesh
(74) *Attorney, Agent, or Firm* — Kramer & Amado, P.C.

(57) ABSTRACT

Various exemplary embodiments relate to a method, network node, and non-transitory machine-readable storage medium including one or more of the following: receiving, at an authentication server, a request message including a plurality of attributes having respective attribute names and respective attribute values; retrieving a profile object that identifies a first attribute name; reading a first attribute value from a first attribute of the plurality of attribute values, wherein the first attribute carries the first attribute name; generating a first subscription identifier that carries the first attribute value; identifying a first subscriber profile that stores the first subscription identifier; and authenticating the request message based on the first subscriber profile.

18 Claims, 6 Drawing Sheets

| 510 | RADIUS-ACCESS-REQUEST Header | |
|---|---|---|
| 520 | NAS-IP-Address | 192.0.2.2 |
| 530 | User-Name | user1 |
| 540 | Agent-Circuit-ID | circuit0 |
| 550 | Service-Type | Framed(2) |
| 560 | ... | ... |

FIG. 6

| 610 | Name | NAS Region A Profile | |
|---|---|---|---|
| 620 | | Subscription IDs | |
| | Subscription ID Type | Attribute Pattern | |
| 630 | End User NAI | {User-Name}-{Agent-Circuit-Id} | |
| 640 | End User Private | {Agent-Circuit-Id}-{Client-Hardware-Addr} | |
| 650 | ... | ... | |

FIG. 7

| 710 | NAS Identifier | NAS-A |
|---|---|---|
| 720 | NAS IP Address | 192.0.2.2 |
| 730 | NAS Profile | NAS Region A Profile |
| 740 | ... | ... |

FIG. 8

| 810 | Subscriber Name | John Doe |
|---|---|---|
| 820 | | Subscription IDs |
| | Subscription ID Type | Value |
| 830 | End User NAI | user1-circuit0 |
| 840 | ... | ... |

FLEXIBLE AND GENERALIZED AUTHENTICATION

TECHNICAL FIELD

Various exemplary embodiments disclosed herein relate generally to authentication and authorization and, more particularly but not exclusively, to RADIUS server authentication and authorization methods.

BACKGROUND

Subscription-based services, such as television, telephone, and Internet access, utilize various types of servers to perform authentication, authorization, and accounting (AAA) for subscribed users. One popular protocol for supporting AAA functionality is remote authentication dial in user services (RADIUS). As technology adoption increases, RADIUS and other authentication servers are relied on to authenticate increasing numbers of devices at individual customer premises for an expanding variety of services.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a method performed by an authentication server for authenticating a subscriber, the method including: receiving, at an authentication server, a request message including a plurality of attributes having respective attribute names and respective attribute values; retrieving a profile object that identifies a first attribute name; reading a first attribute value from a first attribute of the plurality of attribute values, wherein the first attribute carries the first attribute name; generating a first subscription identifier that carries the first attribute value; identifying a first subscriber profile that stores the first subscription identifier; and authenticating the request message based on the first subscriber profile.

Various embodiments described herein relate to an authentication server for authenticating a subscriber, the authentication server including: a network interface; and a processor in communication with the network interface, the processor being configured to: receive, via the network interface, a request message including a plurality of attributes having respective attribute names and respective attribute values; retrieve a profile object that identifies a first attribute name; read a first attribute value from a first attribute of the plurality of attribute values, wherein the first attribute carries the first attribute name; generate a first subscription identifier that carries the first attribute value; identify a first subscriber profile that stores the first subscription identifier; and authenticate the request message based on the first subscriber profile.

Various embodiments described herein relate to a non-transitory machine-readable storage medium encoded with instructions for execution by an authentication server for authenticating a subscriber, the non-transitory machine-readable storage medium including: instructions for receiving, at an authentication server, a request message including a plurality of attributes having respective attribute names and respective attribute values; instructions for retrieving a profile object that identifies a first attribute name; instructions for reading a first attribute value from a first attribute of the plurality of attribute values, wherein the first attribute carries the first attribute name; instructions for generating a first subscription identifier that carries the first attribute value; instructions for identifying a first subscriber profile that stores the first subscription identifier; and instructions for authenticating the request message based on the first subscriber profile.

Various embodiments are described wherein: the profile object additionally identifies a second attribute name, the method further includes reading a second attribute value from a second attribute of the plurality of attribute values, wherein the second attribute carries the second attribute name, and the first subscription identifier additionally carries the second attribute value.

Various embodiments are described wherein: the profile object identifies the first attribute name and second attribute name as part of a value pattern specifying at least one of an attribute name order and an additional character, and the first subscription identifier carries the first attribute name and second attribute name consistent with the value pattern.

Various embodiments are described wherein: the profile object identifies the first attribute name in association with a first subscription identifier type, and the first subscription identifier additionally carries the first subscription identifier type.

Various embodiments additionally include attempting to authenticate the request message based on second attribute name identified by the profile object in association with a second subscription identifier type, and proceeding to the generating the first subscription identifier step based on a failure of attempting to authenticate based on the second attribute name identified by the profile object in association with a second subscription identifier type.

Various embodiments are described wherein retrieving the profile object includes: identifying a requested network access server (NAS) from the request message; and locating a NAS definition associated with the requested NAS, wherein the profile object includes at least one of the NAS definition and another object.

Various embodiments are described wherein retrieving the profile object further includes retrieving a NAS profile object identified by the NAS definition, wherein the profile object includes the NAS profile object.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., or), unless otherwise indicated (e.g., "or else" or "or in the alternative"). Additionally, the various embodiments described herein are not necessarily mutually exclusive and may be combined to produce additional embodiments that incorporate the principles described herein.

Figure 1:
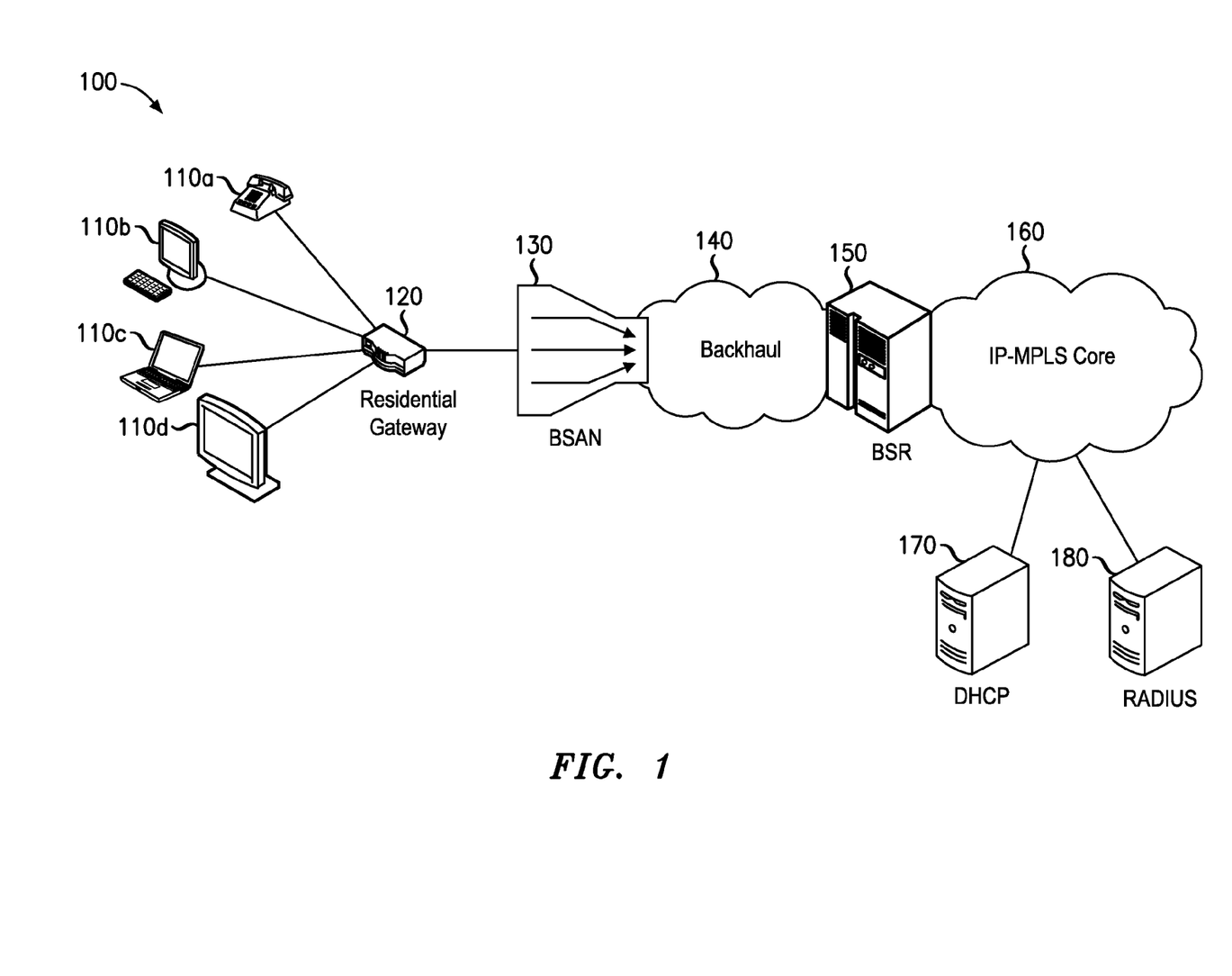
FIG. 1 illustrates an exemplary environment for providing subscription-based services.

FIG. 1 illustrates an exemplary environment 100 for providing subscription-based services. As shown, the exemplary environment 100 may provide "triple-play" services including television, telephone, and Internet service to a subscriber. As such, a subscriber premise may include multiple user devices 110. For example, the subscriber may control a telephone 110a, desktop computer 110b, laptop computer 110c, and television 110d. It will be apparent that various additional or alternative devices may utilize services provided in the exemplary environment 100 such as, for example, mobile phones, tablets, set top boxes, or game consoles.

Traffic from the various user devices 110 may flow through a single residential gateway 120 at the customer premises. The residential gateway 120, in turn forwards traffic to and from a broadband service access node (BSAN) 130. In various embodiments, the BSAN 130 may alternatively be a digital subscriber line access multiplexer (DSLAM), a multi-service access node (MSAN), or other similar device. The BSAN 130 provides access to the backhaul network 140 which may transfer traffic according to the Ethernet protocol and may provide access to a broadband service router (BSR) 150.

The BSR 150 may be a device that performs various subscriber management functions such as traffic filtering for non-authorized traffic and functioning as a liaison between user devices 110 and various downstream devices 170, 180 that are used to establish service for the user devices 110. In various alternative embodiments, the backhaul network 140 may not provide direct access to the BSR 150; instead, the backhaul network 140 may provide access to a broadband services aggregator (BSA) (not shown) that forwards traffic over an aggregation network (not shown), such as an IP multi-protocol label switching (MPLS) network, to a BSR. In some such embodiments, the BSA may perform subscriber management functions instead of or in addition to, the BSR 150.

The BSR 150 provides access to a core network 160, such as an IP-MPLS core. A DHCP server 170 and RADIUS server 180 are both accessible via the core network 160. The DHCP server 170 is a device that allocates IP addresses to user devices 110 and other devices (not shown). The RADIUS server 180 is a device that performs various authentication, authorization, and accounting functions for the user devices 110 and other devices. It will be apparent that alternative authentication servers may be used instead of or in addition to the RADIUS server 180 such as, for example, a Diameter server. Various alternative authentication servers will be apparent and may employ the features described herein.

Figure 2:
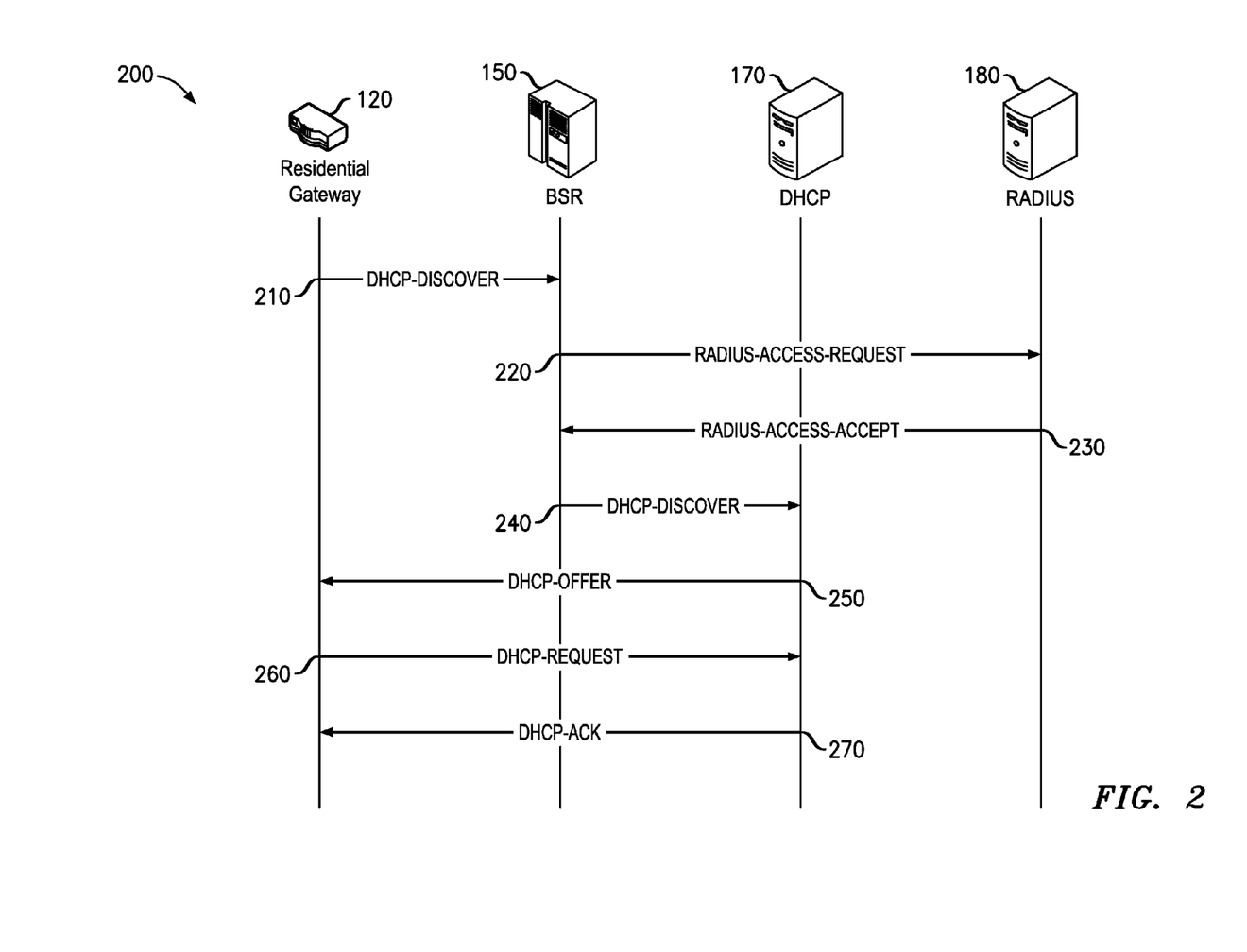
FIG. 2 illustrates an exemplary message exchange for establishing subscription-based services.

FIG. 2 illustrates an exemplary message exchange 200 for establishing subscription-based services. The message exchange 200 occurs between the various components 120, 150, 170, 180 of the exemplary environment 100. Various modifications to the message exchange for alternative environments, such as environments including a BSA that provides subscriber management functions, will be apparent.

The residential gateway 120 initiates the message exchange to begin providing a service to a connected user device by sending a DCHP-DISCOVER message 210 to the BSR 150 to request an IP address for the user device. Before passing the DHCP-DISCOVER message 210 to the DHCP server 170, the BSR 150 communicates with the RADIUS server 180 to determine whether the user device or residential gateway are entitled to access the network and receive services. To do so, the BSR 150 constructs and transmits a RADIUS-ACCESS-REQUEST message 220 to the RADIUS server 180. The RADIUS-ACCESS-REQUEST message 220 includes various values that may be used by the RADIUS server 180 to authenticate the residential gateway 120 or user device. For example, the RADIUS server 180 may determine that a MAC address of the residential gateway, as reported by the RADIUS-ACCESS-REQUEST message 220 is associated with an authorized subscriber. Methods for performing this authentication will be described in greater detail below with respect to FIGS. 3-10. After authenticating the residential gateway 120 or user device, the RADIUS server 180 responds to the BSR 150 with a RADIUS-ACCESS-ACCEPT message 230, indicating that the residential gateway 120 or user device is authorized for the requested service. After receiving the RADIUS-ACCESS-ACCEPT message 230, the BSR 150 transmits the DHCP-DISCOVER request to the DHCP server 170. The DHCP server 170 may then provision the requested IP address according to standard procedures by responding to the residential gateway 120 with a DHCP-OFFER message 250, receiving a DCHP-REQUEST message 260 in response, and finally transmitting a DHCP-ACK message 270.

Typical RADIUS servers are configured with inflexible authentication procedures. For example, RADIUS servers might perform all authentications based on a residential gateway MAC address. It will be apparent that such a procedure may lead to problems in various contexts, such as in the context of the exemplary environment 100 where, for example, a user of user device 110c may be able to access a circuit provisioned for the user of user device 110b because both devices 110b, 110c are associated with the same residential gateway MAC address. This problem could lead to potential loss of revenue and other issues. Accordingly, the methods and system described herein provide a flexible authentication that enables an operator to define the authentication behavior of the RADIUS server 180. As will be seen with regard to the following description, various embodiments enable an operator to specify any combination of values carried by the RADIUS-REQUEST-MESSAGE (or otherwise available to the RADIUS server 180) to be used in performing authentication of a subscriber.

Figure 3:
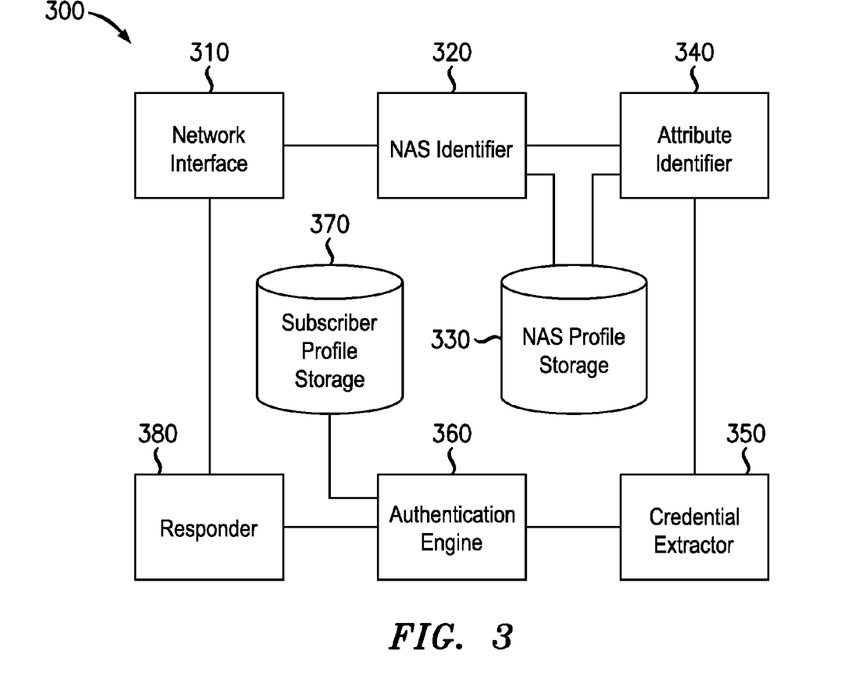
FIG. 3 illustrates an exemplary authentication server.

FIG. 3 illustrates an exemplary authentication server 300. In various embodiments, the authentication server is a RADIUS server, such as the RADIUS server 180 of the exemplary environment 100. It will be apparent that the exemplary authentication server 300 may be a simplification in some respects and may include additional components (not shown). For example, the authentication server 300 may additionally implement authorization and accounting functionality and, as such, may include components for implementing such functionality. It will further be apparent that various hardware devices implement the various components of the authentication server 300 and that the authentication server may be, in some respects, an abstraction. Exemplary hardware for implementing the components of the authentication server 300 (or other authentication servers implemented according to the techniques described herein) will be described in greater detail with respect to FIG. 4.

The exemplary authentication server 300 includes a network interface 310 configured to receive requests for authentication from other devices, such as a BSR, BSA, or any other device that may send such a request. As used herein, the terms "request for authentication" and "authentication requests" will be understood to refer to any message for which the authentication server 300 performs authentication. Thus, the authentication message may not solely or explicitly request authentication. The network interface 310 may include hardware or executable instructions on a machine-readable storage medium configured to exchange messages with other devices according to one or more communications protocols. For example, the network interface 310 may include an Ethernet or TCP/IP interface. The network interface 310 may implement various other protocol stacks such as, for example, a RADIUS or Diameter stack. In various embodiments, the network interface 310 may include multiple physical ports.

Upon receiving an authentication request, the network interface 310 forwards the message to the NAS identifier to begin the process of authentication. It will be apparent that the authentication server 300 may perform various other processing on the authentication request prior to performing authentication and that various intermediate components may process the message between the network interface 310 and NAS identifier 320 (or any other two components of the authentication server 300). The NAS identifier 320 may include hardware or executable instructions configured to identify a network access server (NAS) to which a request message applies. For example, the NAS identifier 320 may read a value from the request message, such as a NAS IP address, and locate an associated NAS definition in the NAS profile storage 330. The NAS identifier 320 then passes the NAS definition to the attribute identifier.

The NAS profile storage 330 may be any machine-readable medium capable of storing various NAS definitions, NAS profiles, or other profile objects. Accordingly, the NAS profile storage 330 may include a machine-readable storage medium such as read-only memory (ROM), random-access memory (RAM), magnetic disk storage media, optical storage media, flash-memory devices, or similar storage media. Exemplary contents for the NAS profile storage 330 will be described in greater detail below with respect to FIGS. 6-7.

The attribute identifier 340 may include hardware or executable instructions configured to determine which attributes from the request message (or elsewhere) will be used to authenticate the user. In the example of a RADIUS server, the attributes identified by the attribute identifier 340 may be attribute-value pairs (AVPs), such as those defined among various standards. In various embodiments, the attribute identifier 340 may read the attributes to be used from the NAS definition received from the NAS identifier 320, from a NAS profile identified by the NAS definition, or from another profile object.

After identifying the attributes to be used for authentication, the attribute identifier 340 passes these attribute names to the credential extractor 350. The credential extractor 350 may include hardware or executable instructions configured to locate values for the identified attributes. For example, the credential extractor 350 may attempt to read a value carried by the received authentication request in association with each identified attribute name. Using the read values, the credential extractor 350 may generate one or more subscription identifiers.

The credential extractor 350 may pass subscription identifiers to the authentication engine 360 to perform authentication against the subscriber profile. The authentication engine 360 may include hardware or executable instructions configured to attempt to locate a subscriber profile within the subscriber profile storage 370 that carries the specified subscription identifier. The authentication engine 360 then passes the result of this attempt, possibly with the located subscriber profile, to the responder 380.

The subscriber profile storage 370 may be any machine-readable medium capable of storing subscriber profiles. Accordingly, the subscriber profile storage 370 may include a machine-readable storage medium such as read-only memory (ROM), random-access memory (RAM), magnetic disk storage media, optical storage media, flash-memory devices, or similar storage media. Exemplary contents for the subscriber profile storage 370 will be described in greater detail below with respect to FIG. 8. In various embodiments, the authentication server may alternatively or additionally interface with an external subscriber profile repository (SPR) or other external storage for subscriber profiles. In such embodiments, the authentication server 300 may additionally or alternatively include a component for retrieving subscriber records from such an external device.

The responder 380 may include hardware or executable instructions configured to respond, via the network interface 310, to the requesting device. For example, where the request message is a RADIUS-ACCESS-REQUEST, the responder 380 may generate and transmit a RADIUS-ACCESS-ACCEPT or RADIUS-ACCESS-REJECT message. It will be apparent that, in various embodiments wherein the authentication server 300 performs functions in addition to authentication, such as authorization and accounting, the responder 380 may base the response on input from other components. For example, the responder 380 may decide between an accept and a reject message based on an indication from an authorization engine as to whether the authenticated subscriber is authorized to access the requested service. Various additional modifications will be apparent.

Figure 4:
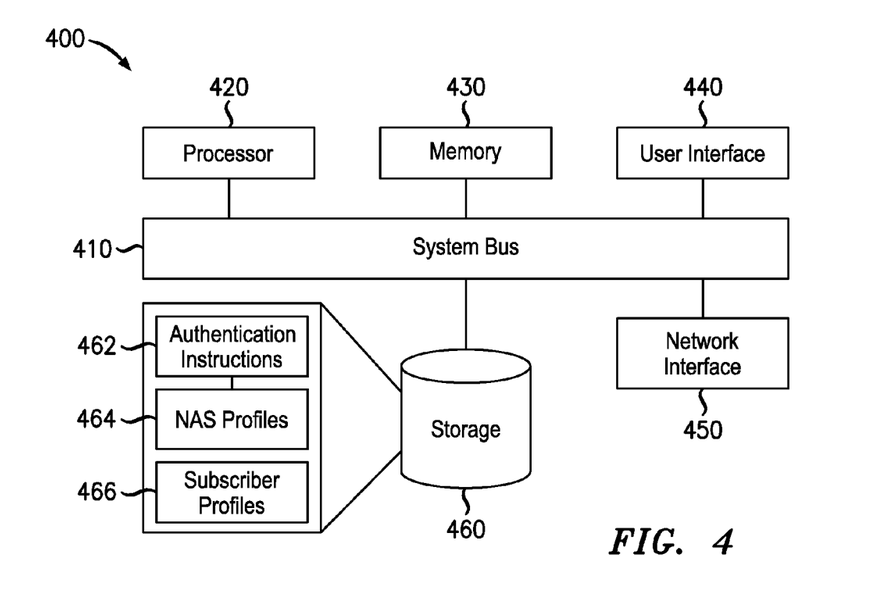
FIG. 4 illustrates an exemplary hardware diagram for an authentication server.

FIG. 4 illustrates an exemplary hardware diagram for an authentication server 400. The exemplary authentication server 400 may correspond to the authentication server 300 of FIG. 3 or the RADIUS server 180 of FIGS. 1-2. As shown, the authentication server 400 includes a processor 420, memory 430, user interface 440, network interface 450, and storage 460 interconnected via one or more system buses 410. It will be understood that FIG. 4 constitutes, in some respects, an abstraction and that the actual organization of the components of the authentication server 400 may be more complex than illustrated.

The processor 420 may be any hardware device capable of executing instructions stored in memory 430 or storage 460. As such, the processor may include a microprocessor, field programmable gate array (FPGA), application-specific integrated circuit (ASIC), or other similar devices.

The memory 430 may include various memories such as, for example L1, L2, or L3 cache or system memory. As such, the memory 430 may include static random access memory (SRAM), dynamic RAM (DRAM), flash memory, read only memory (ROM), or other similar memory devices.

The user interface 440 may include one or more devices for enabling communication with a user such as an administrator. For example, the user interface 440 may include a display, a mouse, and a keyboard for receiving user commands.

The network interface 450 may include one or more devices for enabling communication with other hardware devices. For example, the network interface 450 may include a network interface card (NIC) configured to communicate according to the Ethernet protocol. Additionally, the network interface 450 may implement a TCP/IP stack for communication according to the TCP/IP protocols. Various alternative or additional hardware or configurations for the network interface 450 will be apparent.

The storage 460 may include one or more machine-readable storage media such as read-only memory (ROM), random-access memory (RAM), magnetic disk storage media, optical storage media, flash-memory devices, or similar storage media. In various embodiments, the storage 460 may store instructions for execution by the processor 420 or data upon with the processor 420 may operate. For example, the storage 460 may store authentication instructions 462 for performing authentication of an authentication request according to the concepts described herein. The storage may also store NAS profiles 464 and subscriber profiles 466 for use by the processor executing the authentication instructions 462.

It will be apparent that various information described as stored in the storage 460 may be additionally or alternatively stored in the memory 430. For example, the authentication instructions may be stored, at least partially, in memory 430 for execution by the processor 420. As another example, in embodiments wherein the authentication server 400 interfaces with an external SPR, the memory 430 may instead store those subscriber profiles 466 that have been fetched for processing. In this respect, the memory 430 may also be considered to constitute a "storage device." Various other arrangements will be apparent. Further, the memory 430 and storage 460 may both be considered to be "non-transitory machine-readable media." As used herein, the term "non-transitory" will be understood to exclude transitory signals but to include all forms of storage, including both volatile and non-volatile memories.

While the authentication server 400 is shown as including one of each described component, the various components may be duplicated in various embodiments. For example, the processor 420 may include multiple microprocessors that are configured to independently execute the methods described herein or are configured to perform steps or subroutines of the methods described herein such that the multiple processors cooperate to achieve the functionality described herein. In some embodiments, such as those wherein the authentication server 400 is implemented in a cloud computing architecture, components may be physically distributed among different devices. For example, the processor 420 may include a first microprocessor in a first data center and a second microprocessor in a second data center. Various other arrangements will be apparent.

Figure 5:
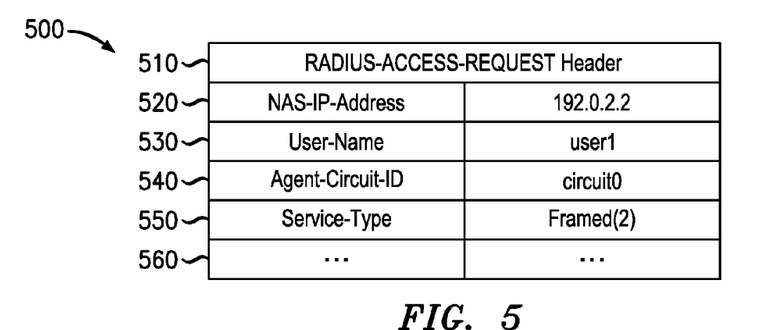
FIG. 5 illustrates an exemplary access request message.

FIG. 5 illustrates an exemplary access request message 500. In the example shown, the request message 500 is a RADIUS-ACCESS-REQUEST message, such as the RADIUS-ACCESS-REQUEST message 220 sent by the BSR 150 to the RADIUS server 180 in the exemplary message exchange 200 of FIG. 2. The request message 500 includes a header 510 and multiple attributes 520-560. In the example of a RADIUS-ACCESS-REQUEST message, the header 510 is constructed according to the RADIUS protocol to identify the message 500 to receiving devices as a RADIUS-ACCESS-REQUEST.

Further according to the RADIUS example, the attributes 520-560 may include standard and non-standard attribute-value pairs (AVPs). As an example, four AVPs 520-550 are described, but it will be understood that the message 500 may include numerous additional or alternative AVPs or other attributes 560. As shown, a NAS-IP-Address may indicate that service is requested via a NAS at IP address 192.0.2.2. The User-Name AVP 530 and Agent-Circuit-ID AVP 540 together indicate that the service is requested for the user "user1" on provisioned circuit "circuit0." The Service-Type AVP 550 identifies the requested service as a "Framed(2)" service.

Figure 6:
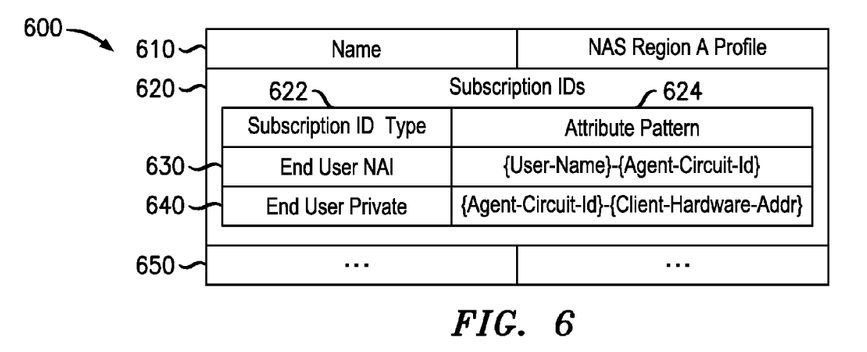
FIG. 6 illustrates an exemplary profile object.

FIG. 6 illustrates an exemplary profile object 600. The exemplary profile object may be a NAS profile object 464 stored in storage 460 and, as such, may reflect partial contents of the NAS profile storage 330. It will be apparent that the profile object 600 may be an abstraction and may be stored in any manner known to those of skill in the art such as, for example, a table, linked list, array, database, or other structure. In some embodiments, the profile object 600 may be retrievable using a query language such as, for example, the structured query language (SQL).

As shown, the profile object 600 is associated with a name, "NAS Region A Profile," for use by other constructs in referring to the profile object. For example, as will be explained below with respect to FIG. 7, various NAS definitions may identify applicable profile objects. The profile object may also include a subscription IDs field 620 for defining one or more subscription IDs to be used in authenticating requests for service when the profile object 600 is used. Each subscription ID definition may include a subscription ID type field 622 and an attribute pattern field 624. The subscription ID type field 622 may store a type name for the subscription ID defined by a definition, such that the authentication server may determine against which subscription IDs configured for a user a subscription ID constructed according to the definition will be compared. The attribute pattern field 624 defines a pattern to be used in constructing a subscription ID value. The pattern may include one or more attribute names that indicating from where values should be obtained in constructing the value. The pattern may also define the order in which the values will occur in the subscription ID value and additional static characters that will be copied into the subscription ID value. Various syntaxes for defining such a pattern may be used.

As an example, the subscription ID definition 630 indicates that an "End User NAI" type subscription ID should be used to authenticate when the profile object 600 is applicable. The subscription ID definition 630 also indicates that the value will be constructed to include the values of the User-Name AVP and Agent-Circuit-Id AVP from the request message, separated by a single dash "-" character. Thus, in the example of the request message 500 of FIG. 5, the authentication server may construct (if the profile object 600 is deemed applicable to the request 500) an "End User NAI" subscription ID having the value "user1-circui0."

As another example, the subscription ID definition 640 indicates that an "End User Private" type subscription ID should be used to authenticate when the profile object 600 is applicable. In various embodiments, a user may be authenticated when any single subscription ID defined in the subscription IDs field 620 is matched to a user profile, while other embodiments may require a specific set, a specific number, or all defined subscription IDs to match a user profile for authentication. The subscription ID definition 640 also indicates that the value will be constructed to include the values of the "Agent-Circuit-Id" and "Client-Hardware-Addr" AVPs from the request message, separated by a single dash "-" character. In the example of the request message 500 of FIG. 5, the authentication server may not be able to construct an "End User Private" subscription identifier unless the additional AVPs 560 include a value for a "Client-Hardware-Addr" AVP. The profile object may include numerous additional fields 650.

Figure 7:
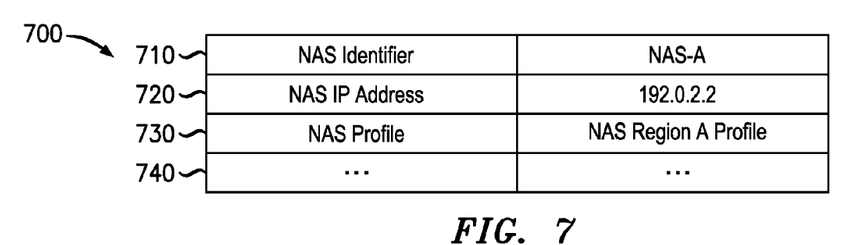
FIG. 7 illustrates an exemplary network access server definition.

FIG. 7 illustrates an exemplary network access server (NAS) definition 700. The NAS definition 700 may be stored in storage 460 and, as such, may reflect partial contents of the NAS profile storage 330. It will be apparent that the NAS definition 700 may be an abstraction and may be stored in any manner known to those of skill in the art such as, for example, a table, linked list, array, database, or other structure. In some embodiments, the NAS definition 700 may be retrievable using a query language such as, for example, the structured query language (SQL).

As shown, the NAS definition 700 specifies a name 710, "NAS-A," for the NAS to which the definition 700 applies. The NAS definition 700 also includes an IP address 720 of the NAS, "192.0.2.2" that may be used to determine whether the NAS definition 700 applies to a received message. Additionally, the NAS definition 700 specifies one or more NAS profiles 730 that should be deemed applicable to authentication when the NAS definition 700 is applicable. As shown, the definition 700 indicates the name "NAS Region A Profile." In the example of the request message 500 of FIG. 5 and the NAS profile 600 of FIG. 6, an authentication server may first determine that the NAS definition 700 is applicable because the NAS-IP-Address AVP 520 of the request message 500 matches the value of the NAS IP address field 720 of the NAS definition 700. Then, the authentication server may go on to determine that the NAS profile 600 should be used because the NAS definition 700 specifies the NAS profile name 730 "NAS Region A Profile," which is stored in the name field 610 of the NAS profile 600. The NAS definition 700 may include numerous additional fields 740.

In some embodiments, a separate NAS profile may not be used. In some such embodiments and in embodiments that enable multiple locations for subscription ID definitions, a subscription ID field similar to the subscription ID field 620 of the NAS profile 600. In such embodiments, the NAS definition may be viewed as constituting a profile object because the NAS definition itself serves to identify the attributes that will be used for authentication.

Figure 8:
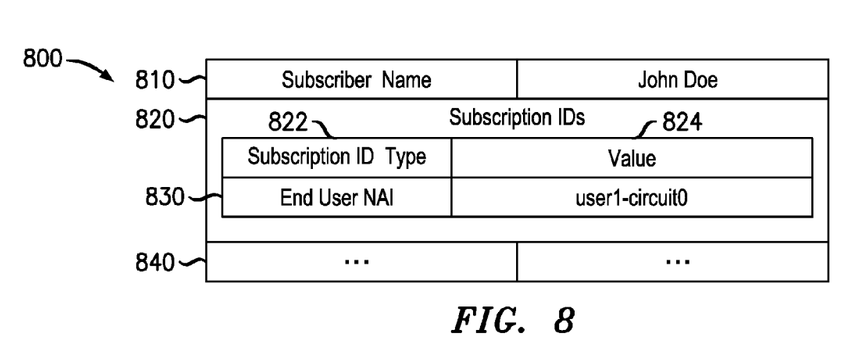
FIG. 8 illustrates an exemplary subscriber profile.

FIG. 8 illustrates an exemplary subscriber profile 800. The subscriber profile 800 may be stored in storage 460 and, as such, may reflect partial contents of the subscriber profile storage 370. Alternatively, the subscriber profile 800 may be stored in an external device, such as an SPR. It will be apparent that the subscriber profile 800 may be an abstraction and may be stored in any manner known to those of skill in the art such as, for example, a table, linked list, array, database, or other structure. In some embodiments, the subscriber profile 800 may be retrievable using a query language such as, for example, the structured query language (SQL).

As shown, the subscriber profile identifies a name 810 of the subscriber "John Doe." The subscriber profile 800 also includes a subscription IDs field 820 for storing one or more subscription IDs associated with the subscriber. The subscription ID type field 822 may store a type name for the subscription ID defined by an entry. The value field 824 stores a value for that subscription ID against which a generated subscription ID may be compared for authentication.

As an example, the subscription ID 830 is of the "End User NAI" type and stores a value of "user1-circuit0." Thus, in the example of FIGS. 5-7, the authentication server, having generated an "End User NAI" subscription ID having a value of "user1-circuit0" based on the subscription ID definition 630 and the relevant AVPs 530, 540 of the authentication request 500, may determine that the subscriber "John Doe" is authenticated for the authentication request 500. The subscription profile 800 may include numerous additional fields 840, such as fields that may define authorized services for the subscriber.

Figure 9:
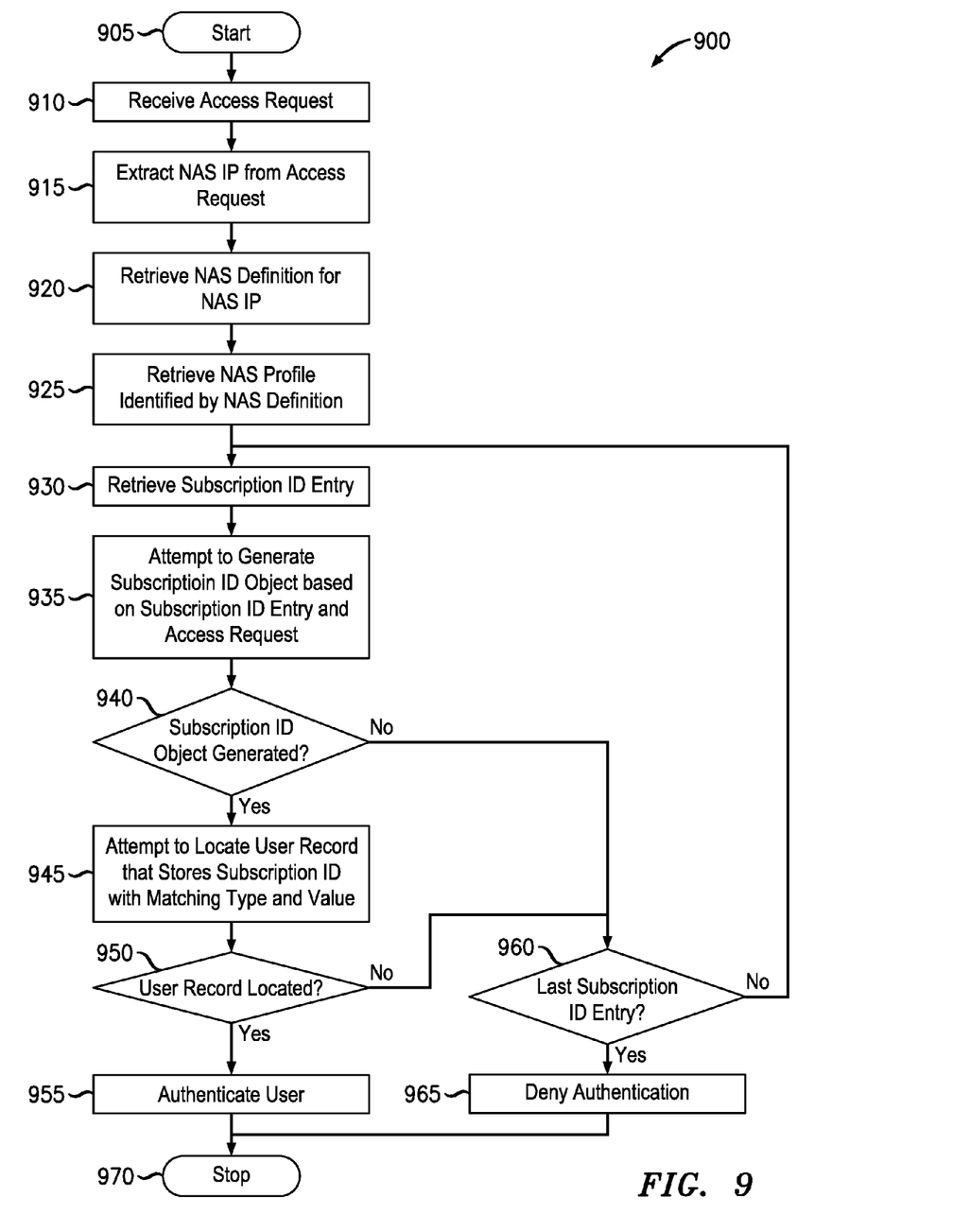
FIG. 9 illustrates an exemplary method for authenticating a subscriber.

FIG. 9 illustrates an exemplary method 900 for authenticating a subscriber. The method 900 may be performed by an authentication server, such as the RADIUS server 180 or the exemplary authentication servers 300, 400.

The exemplary method 900 begins in step 905 and proceeds to step 910 where the authentication server receives an authentication request such as, for example, a RADIUS-ACCESS-REQUEST message. In step 915, the authentication server extracts a NAS IP from the authentication request and, in step 920, locates a NAS definition such as the exemplary NAS definition 700 associated with the NAS IP. In step 925, the authentication server retrieves a NAS profile identified by the NAS definition, such as the exemplary NAS profile 600.

Once the authentication server has gathered the appropriate profile objects, the authentication server proceeds to construct a subscription identifier for use in authentication by retrieving a first subscription ID definition from the NAS profile in step 930. Then, based on the retrieved subscription ID definition, the authentication server attempts to generate a subscription ID using the values available in the received authentication request in step 935. An exemplary method of generating a subscription ID object will be explained in greater detail below with respect to FIG. 10. In step 940, the authentication server determines whether step 935 successfully generated a subscription ID object or if the process failed. If no valid subscription ID object was generated, the method 900 proceeds to step 960. Otherwise, the method proceeds to step 945.

In step 945, the authentication server uses the subscription ID object to attempt to locate a subscription record that stores a matching subscription ID. For example the authentication server may form and submit an SQL query to locate such a subscription record. The authentication server then determines, in step 950, whether any such user record was located. If not matching record was found, the method proceeds to step 960.

In step 960, the authentication server has determined, either in step 940 or step 950, that authentication cannot be granted based on the current subscription ID definition from the profile. The authentication server determines whether this subscription ID definition represents the last such definition carried by the NAS profile. If not, and additional subscription ID definitions remain for consideration, the method 900 loops back to step 930 to process additional subscription ID definitions. Otherwise, the authentication server may determine that the authorization request cannot be authenticated and denies the authentication in step 965 by, for example, responding to the requesting device with a RADIUS-ACCESS-REJECT message. The method 900 then proceeds to end in step 970.

If, on the other hand, the authentication server successfully locates a subscription profile, the authentication server proceeds to authenticate the user in step 955. This step may include sending a message to the requestor, such as a RADIUS-ACCESS-ACCEPT message. Additionally or alternatively, this step may include indicating to another component that the authentication request is authenticated and that additional functions, such as authorization or accounting, may now be performed. The method 900 then proceeds to end in step 970.

Figure 10:
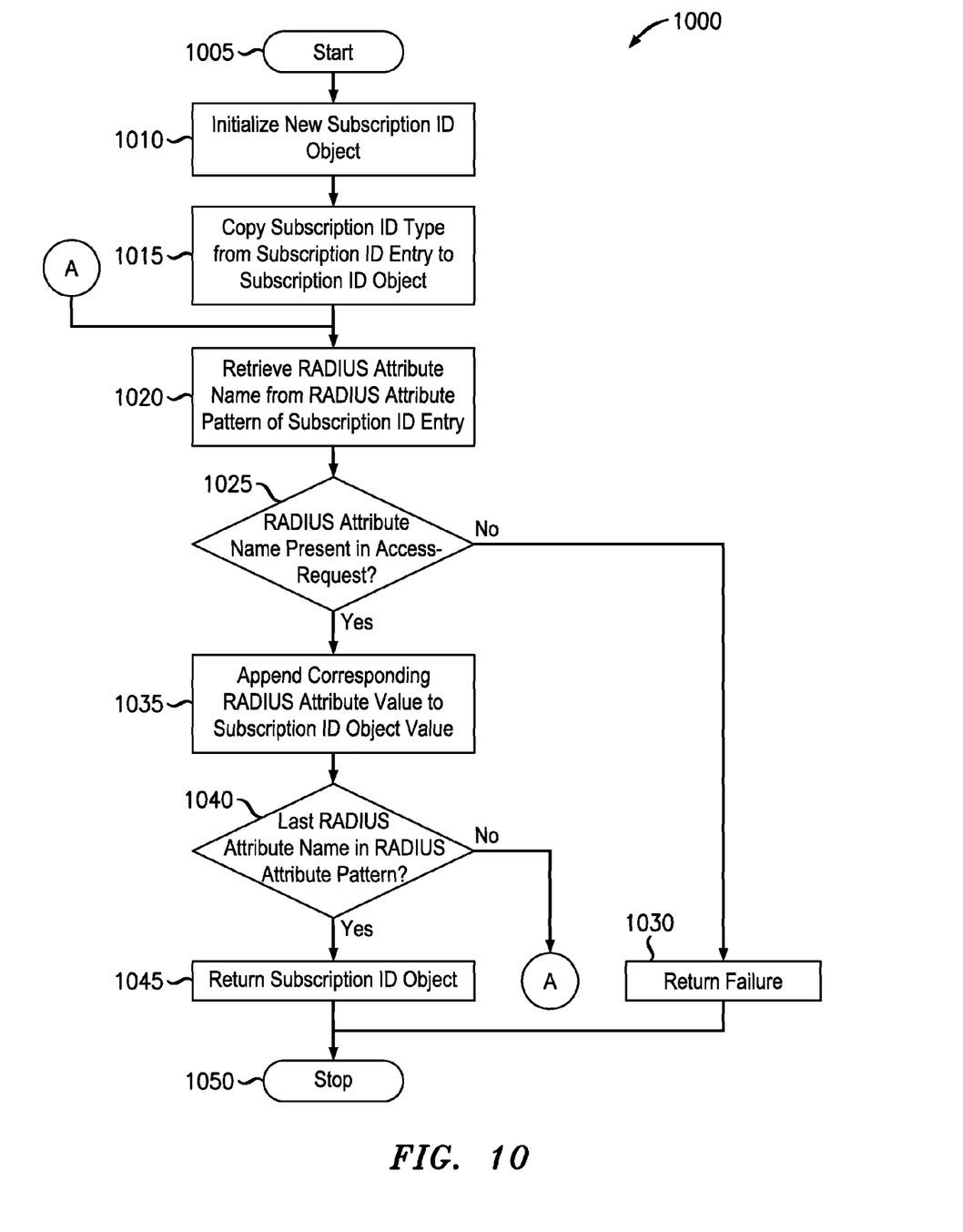
FIG. 10 illustrates an exemplary method for generating a subscription identifier.

FIG. 10 illustrates an exemplary method 1000 for generating a subscription identifier. The method 1000 may be performed by an authentication server, such as the RADIUS server 180 or the exemplary authentication servers 300, 400. In various embodiments, the method 1000 may correspond to step 935 of the exemplary method 900 for performing authentication.

The method 1000 begins in step 1005 and proceeds to step 1010 where the authentication server initializes a new subscription ID object. In various embodiments, the subscription ID object may store a type and a value. In step 1015, the authentication server copies the subscription ID type from the current subscription ID definition to the new subscription ID object. Then the authentication server proceeds to begin generating the value by, in step 1020, retrieving a first RADIUS attribute name from the attribute pattern provided in the subscription ID definition.

In step 1025, the authentication server determines whether the authentication request includes a value for the current RADIUS attribute name. If not, the authentication server may be unable to generate a subscription ID for the current subscription ID definition and the method 1000 proceeds to step 1030 where the method 1000 returns an error and proceeds to end in step 1050.

If, on the other hand, the authentication server determines in step 1025 that the authentication request does include a value for the current RADIUS attribute name, the method proceeds to step 1035 where the authentication server copies the value from the authentication request message attribute to the end of the current value for the subscription ID object. This append operation may also include copying any surrounding static characters that have not yet been copied from the pattern to the value. In step 1040, the authentication server determined whether the current RADIUS attribute is also the last RADIUS attribute defined in the pattern. If not and additional RADIUS attributes remain in the pattern to be copied to the subscription ID value, the method 1000 loops back to step 1020 to perform this additional processing. Otherwise, the method 1000 proceeds to return the finished subscription ID object and end in step 1050.

According to the foregoing, various embodiments enable the flexible definition of authentication behavior by an authentication server. For example, by providing an ability to specify which attributes are used in authentication, the authentication process is generalized and enables an operator of the authentication server to use virtually any attributes desired for authentication. Further, by tying such a specification to a profile that may be assigned to different NASs or other entities, the behavior of the authentication server may be varied for different entities or groups of entities. Various additional benefits will be apparent in view of the foregoing.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by an authentication server for authenticating a subscriber, the method comprising:
    receiving, at an authentication server, a request message including a plurality of attributes having respective attribute names and respective attribute values;
    retrieving a profile object that identifies a first attribute name in association with a first subscription identifier type;
    reading a first attribute value from a first attribute of the plurality of attribute values, wherein the first attribute carries the first attribute name;
    identifying a second attribute name identified by the profile object in association with a second subscription identifier type;
    authenticating the request message based on the second attribute name in association with the second subscription identifier type;
    if the authenticating fails, generating a first subscription identifier that carries the first attribute value;
    after generating the first subscription identifier, identifying a first subscriber profile using the first subscription identifier; and
    authenticating the request message based on the first subscriber profile.

2. The method of claim 1, wherein:
    the profile object additionally identifies a second attribute name,
    the method further comprises reading a second attribute value from a second attribute of the plurality of attribute values, wherein the second attribute carries the second attribute name, and
    the first subscription identifier additionally carries the second attribute value.

3. The method of claim 2, wherein:
the profile object identifies the first attribute name and second attribute name as part of a value pattern specifying at least one of an attribute name order and an additional character, and
the first subscription identifier carries the first attribute name and second attribute name consistent with the value pattern.

4. The method of claim 1, wherein:
the first subscription identifier additionally carries the first subscription identifier type.

5. The method of claim 1, wherein retrieving the profile object comprises:
identifying a requested network access server (NAS) from the request message; and locating a NAS definition associated with the requested NAS,
wherein the profile object comprises at least one of the NAS definition and another object.

6. The method of claim 5, wherein retrieving the profile object further comprises retrieving a NAS profile object identified by the NAS definition, wherein the profile object comprises the NAS profile object.

7. An authentication server for authenticating a subscriber, the authentication server comprising:
a network interface; and
a processor in communication with the network interface, the processor being configured to:
receive, via the network interface, a request message including a plurality of attributes having respective attribute names and respective attribute values;
retrieve a profile object that identifies a first attribute name in association with a first subscription identifier type;
read a first attribute value from a first attribute of the plurality of attribute values, wherein the first attribute carries the first attribute name;
identify a second attribute name identified by the profile object in association with a second subscription identifier type;
authenticate the request message based on the second attribute name in association with the second subscription identifier type;
if authentication fails, generate a first subscription identifier that carries the first attribute value;
after generating the first subscription identifier, identify a first subscriber profile using the first subscription identifier; and
authenticate the request message based on the first subscriber profile.

8. The authentication server of claim 7, wherein:
the profile object additionally identifies a second attribute name,
the processor is further configured to read a second attribute value from a second attribute of the plurality of attribute values, wherein the second attribute carries the second attribute name, and
the first subscription identifier additionally carries the second attribute value.

9. The authentication server of claim 8, wherein:
the profile object identifies the first attribute name and second attribute name as part of a value pattern specifying at least one of an attribute name order and an additional character, and
the first subscription identifier carries the first attribute name and second attribute name consistent with the value pattern.

10. The authentication server of claim 7, wherein:
the first subscription identifier additionally carries the first subscription identifier type.

11. The authentication server of claim 7, wherein, in retrieving the profile object, the processor is configured to:
identify a requested network access server (NAS) from the request message; and
locate a NAS definition associated with the requested NAS,
wherein the profile object comprises at least one of the NAS definition and another object.

12. The authentication server of claim 11, wherein, in retrieving the profile object, the processor is further configured to retrieve a NAS profile object identified by the NAS definition, wherein the profile object comprises the NAS profile object.

13. A non-transitory machine-readable storage medium encoded with instructions for execution by an authentication server for authenticating a subscriber, the non-transitory machine-readable storage medium comprising:
instructions for receiving, at an authentication server, a request message including a plurality of attributes having respective attribute names and respective attribute values;
instructions for retrieving a profile object that identifies a first attribute name in association with a first subscription identifier type;
instructions for reading a first attribute value from a first attribute of the plurality of attribute values, wherein the first attribute carries the first attribute name;
instruction for identifying a second attribute name identified by the profile object in association with a second subscription identifier type;
instructions for authenticating the request message based on the second attribute name in association with the second subscription identifier type;
if the authenticating fails, instructions for generating a first subscription identifier that carries the first attribute value;
instructions for, after generating the first subscription identifier, identifying a first subscriber profile using the first subscription identifier; and
instructions for authenticating the request message based on the first subscriber profile.

14. The non-transitory machine-readable storage medium of claim 13, wherein:
the profile object additionally identifies a second attribute name,
the non-transitory machine-readable storage medium further comprises instructions for reading a second attribute value from a second attribute of the plurality of attribute values, wherein the second attribute carries the second attribute name, and
the first subscription identifier additionally carries the second attribute value.

15. The non-transitory machine-readable storage medium of claim 14, wherein:
the profile object identifies the first attribute name and second attribute name as part of a value pattern specifying at least one of an attribute name order and an additional character, and
the first subscription identifier carries the first attribute name and second attribute name consistent with the value pattern.

16. The non-transitory machine-readable storage medium of claim 13, wherein:
the first subscription identifier additionally carries the first subscription identifier type.

17. The non-transitory machine-readable storage medium of claim 13, wherein the instructions for retrieving the profile object comprise: instructions for identifying a requested network access server (NAS) from the request message; and
instructions for locating a NAS definition associated with the requested NAS,
wherein the profile object comprises at least one of the NAS definition and another object.

18. The non-transitory machine-readable storage medium of claim 17, wherein the instructions for retrieving the profile object further comprise instructions for retrieving a NAS profile object identified by the NAS definition, wherein the profile object comprises the NAS profile object.

* * * * *